(12) United States Patent
Harrington

(10) Patent No.: US 10,438,506 B2
(45) Date of Patent: Oct. 8, 2019

(54) METHOD AND APPARATUS FOR CAPTURING A GOLF SWING AND FITTING A GOLFER

(71) Applicant: Acushnet Company, Fairhaven, MA (US)

(72) Inventor: James P. Harrington, Del Mar, CA (US)

(73) Assignee: Acushnet Company, Fairhaven, MA (US)

( * ) Notice: Subject to any disclaimer, the term of this patent is extended or adjusted under 35 U.S.C. 154(b) by 287 days.

(21) Appl. No.: 15/356,177

(22) Filed: Nov. 18, 2016

(65) Prior Publication Data

US 2018/0140899 A1 May 24, 2018

(51) Int. Cl.
| | |
|---|---|
| A63B 57/00 | (2015.01) |
| G09B 19/00 | (2006.01) |
| G03B 29/00 | (2006.01) |
| H04N 7/18 | (2006.01) |
| G03B 15/00 | (2006.01) |
| G06K 9/00 | (2006.01) |
| A63B 24/00 | (2006.01) |
| A63B 69/36 | (2006.01) |

(52) U.S. Cl.
CPC ......... *G09B 19/0038* (2013.01); *G03B 15/00* (2013.01); *G03B 29/00* (2013.01); *H04N 7/183* (2013.01); *A63B 69/3623* (2013.01); *A63B 2024/0009* (2013.01); *G06K 9/00342* (2013.01)

(58) Field of Classification Search
CPC .... A63B 24/0006; G03B 15/00; G03B 29/00; H04N 7/183; G09B 19/0038
USPC .......................................................... 473/221
See application file for complete search history.

(56) References Cited

U.S. PATENT DOCUMENTS

| | | | | |
|---|---|---|---|---|
| 4,020,348 | A | * | 4/1977 | Turcotte ................ G01T 1/2978 250/363.08 |
| 5,263,718 | A | | 11/1993 | Cameron |
| 5,797,805 | A | * | 8/1998 | Lubell ................ A63B 24/0003 386/E5.002 |
| 6,547,681 | B1 | | 4/2003 | Wood |
| 6,565,448 | B2 | | 5/2003 | Cameron |
| 6,669,571 | B1 | | 12/2003 | Cameron |
| 7,311,611 | B2 | | 12/2007 | Cameron |
| 7,393,286 | B1 | | 7/2008 | Renegar |
| 7,503,858 | B2 | | 3/2009 | Cameron |
| 8,328,660 | B2 | | 12/2012 | Roberts |
| 8,574,091 | B2 | | 11/2013 | Cameron |
| 9,463,366 | B2 | | 10/2016 | Kamino |
| 2015/0105183 | A1 | * | 4/2015 | Kamino ................ A63B 60/46 473/407 |

* cited by examiner

*Primary Examiner* — Jay Trent Liddle
*Assistant Examiner* — Ryan Hsu
(74) *Attorney, Agent, or Firm* — Randy K. Chang

(57) ABSTRACT

An image capturing apparatus is disclosed herein. More specifically, image capturing apparatus disclosed herein will be used to help a golfer properly select a golf club utilizing a high speed camera attached to a gantry apparatus capable of adjusting its own position relative to the golfer in order to capture data of a golf swing in an iron type golf club.

7 Claims, 10 Drawing Sheets

METHOD AND APPARATUS FOR CAPTURING A GOLF SWING AND FITTING A GOLFER

FIELD OF THE INVENTION

The present invention relates generally to equipment used in helping the golfer properly select a golf club that will work best for individual golfer. More specifically, the present invention relates to a high speed camera attached to a gantry apparatus capable of adjusting its own position relative to the golfer in order to capture multiple data points of multiple golf swing in an iron related golf club.

BACKGROUND OF THE INVENTION

The game of golf has always been tied to the equipment used to play the sport. Due to this close relationship, golf equipment engineers have always strived to make the best performing product to help the golfer play his or her best. The challenge in creating the best performing product for golfers lies in that every golfer has a different golf swing; and different swings often need completely different types of golf clubs.

In order to combat this issue, golf club designers often make different models and lines of product to help satisfy the different needs of the different golfers. U.S. Pat. No. 8,328,660 to Roberts et al. provides an illustration of one type of golf club head such as a muscle back iron that includes a blade-like upper mass, a muscle-like lower mass, and recess in the rear surface. This type of muscle back iron may generally be suitable for a better golfer, whose consistent ball striking does not require additional forgiveness. On the opposite end of the spectrum, U.S. Pat. No. 5,263,718 to Salheim (Sic) illustrates a golf club head with enlarged mass concentrations being formed to provide upper protruberances at the heel and toe end of the ridge to help increase the forgiveness of a golf club head.

In addition to the different construction shown above, different golfers often require different sole profiles to fit their different types of golf swings. The difference in sole profiles becomes more important in iron and wedge type golf club heads that consistently interact with the turf. U.S. Pat. No. 7,393,286 to Renegar illustrates one example of a golf club head that focuses on the sole of a golf club by creating a corrugates sole with one or more V-shaped cutouts in an attempt to make one golf club sole profile fit multiple different types of golf swings. However, most modern day golf club designers recognize that the varying golf swings are so dramatically different; it truly necessitates a different sole design profile depending on the needs of the golfer.

U.S. Pat. No. 6,547,681 to Wood et al. provides a one of the earlier attempts to address the diverging needs of different golfers when it comes to fitting a golfer into a correct sole profile. However, U.S. Pat. No. 6,547,681 uses an antiquated method of focusing on the divot shape ignoring numerous other factors that are essential to properly determining the right golf club for a golfer.

Given the current advancement in technology, one can clearly see that there is a need for a more accurate and more efficient way to allow a golfer to find the golf club that fits his or her needs. Hence, it can be seen from above that the current industry needs an innovative apparatus and method for properly fitting a golfer into the appropriate golf club, including the size, dimension, and sole profile.

BRIEF SUMMARY OF THE INVENTION

One aspect of the present invention is a system for capturing a golf swing comprising of a striking location to accommodate a golf ball to be struck with a golf club, an image capturing apparatus, and a computer. The image capturing apparatus further comprising of a gantry providing structural support to the image capturing apparatus, a plurality of wheels attached to a bottom surface of the gantry in order to provide mobility to the image capturing apparatus, a horizontal cross bar adjustably attaches to a top surface of the gantry, a platform adjustably attaches to and drapes down from the horizontal cross bar, and a camera adapted to engage the platform capable of capturing at least one performance variable, wherein the horizontal cross bar and the adjustable platform combine to allow the camera to be adjusted along at least two axis across the image capturing apparatus. The computer is operatively coupled to the camera, the computer further comprises of a memory for storing the at least one performance variable gathered from the camera, and an analyzing software for analyzing the at least one performance variable supplied to the computer.

In another aspect of the present invention is an article of manufacturing creating an image capturing apparatus comprising of a gantry to provide structural support for the image capturing apparatus, a horizontal cross bar adjustably attaches to a top surface of the gantry, a platform adjustably attaches to and drapes down from the horizontal cross bar, and a camera adapted to engage the platform capable of capturing at least one performance variable, wherein the adjustable horizontal cross bar and the adjustable platform combined to allow the camera to be adjusted along at least two axis across the image capturing apparatus, and wherein the camera is a high speed camera capable of a capture rate greater than about ,000 frames per second.

In another aspect of the present invention is a method of fitting a golfer performed by a computer comprising, allowing a golfer to address a golf ball, adjusting a location of a gantry together with a location of a camera to correspond with the golfer's address position, capturing at least one performance variable with said golfer's golf swing, adjusting a location of said camera to a new location corresponding with the golfer's new address position, and analyzing the at least one performance variable and recommending a golf club to the golfer.

These and other features, aspects and advantages of the present invention will become better understood with reference to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

The following detailed description describes the best currently contemplated modes of carrying out the invention. The description is not to be taken in a limiting sense, but is made merely for the purpose of illustrating the general principles of the invention, since the scope of the invention is best defined by the appended claims.

Various inventive features are described below and each can be used independently of one another or in combination with other features. However, any single inventive feature may not address any or all of the problems discussed above or may only address one of the problems discussed above. Further, one or more of the problems discussed above may not be fully addressed by any of the features described below.

Figure 1:
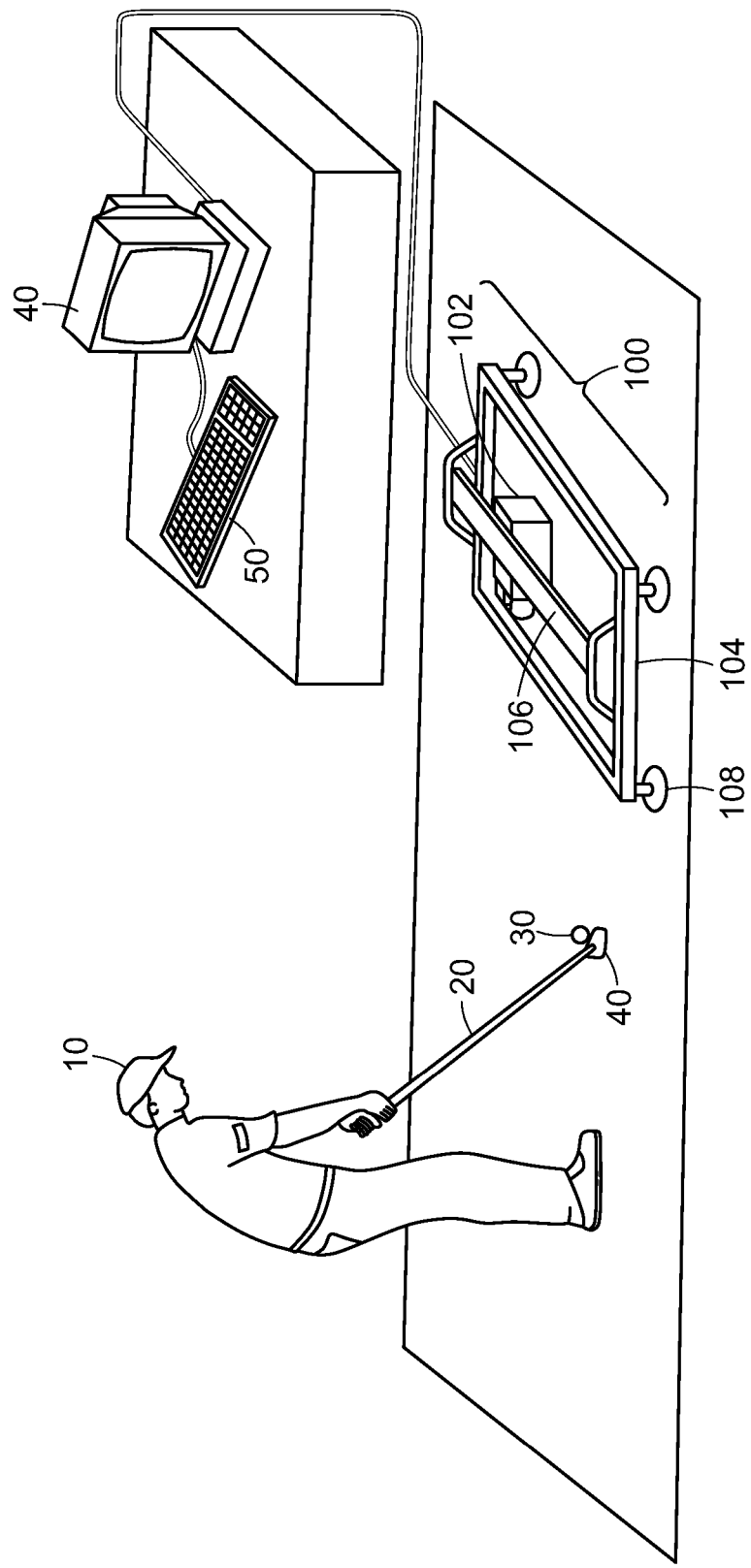
FIG. 1 of the accompanying drawings shows a perspective view of a system for capturing a golf swing in accordance with an exemplary embodiment of the present invention.

FIG. 1 of the accompanying drawing shows a schematic illustration of a mobile image capturing apparatus 100 in accordance with the present invention. The mobile image capturing apparatus 100 shown in FIG. 1 may generally be associated with a golfer 10, holding a golf club 20, generally hitting a golf ball 30 using an iron type golf club head 40. The golfer 10 in this current embodiment of the present invention, may general start off by standing at a fixed distance that is pre-calibrated to yield the most desirable results for the camera 102 attached to the image capturing apparatus 100. However, the distance between the golfer 10 and the image capturing apparatus 100 could stay the same, or alter as the golfer 10 takes multiple golf swings, all without departing from the scope and content of the invention.

Before the discussion here moves onto the discussion regarding the image capturing apparatus 100, it is important to provide some background information on the need for the current inventive image capturing system. Conventional fitting systems that involve cameras generally involve a static apparatus and setup, which require the golfer to hit the golf ball at the same spot every time. This type of setup may be sufficient in a driver type fitting where the ground interaction is minimal. The big issue, as most golfers will tell you, arises when you try to hit repeated shots on golf clubs that contact the ground extensively, such as iron type golf clubs and wedge type golf clubs. To make matters worse, when fitting for a sole profile of a golf club, the turf interaction becomes essential to the proper determination of the needs of the golfer. When the turf interaction becomes a key component of the fitting, the conventional methodology is problematic because it has the golfer repeatedly hit golf shots off artificial turf in order to accommodate the constraints of the conventional camera setup. The present invention creates a portable image capturing apparatus that can be moved onto a real grass type of hitting surface, and provides additional adjustment features to completely address all of the deficiencies of current methodologies in a single compact apparatus.

Shifting the discussion to now focus on the image capturing apparatus 100 itself, FIG. 1 of the accompanying drawings shows an image capturing apparatus 100 further comprising of a camera 102 mounted onto a horizontal crossbar 106 attached to a gantry 104. The gantry 104 shown in FIG. 1 may generally be attached to a plurality of wheels 108, allowing the entirety of the image capturing apparatus 100 to be portable and moved from a fixed location. Finally, FIG. 1 of the accompanying drawings shows some ancillary components that are critical to the proper functionality of the present invention. More specifically, FIG. 1 of the accompanying shows a computer 40 receiving a tangible computer readable medium containing one or more "performance variables" that can be used to determine the proper golf club for the golfer 10. Finally, FIG. 1 shows an input device 50 connected to the computer to capture input from an operator. The input from the operator may be independent of the "performance variables" or could be in response to the "performance variables all without departing from the scope and content of the present invention.

Figure 2:
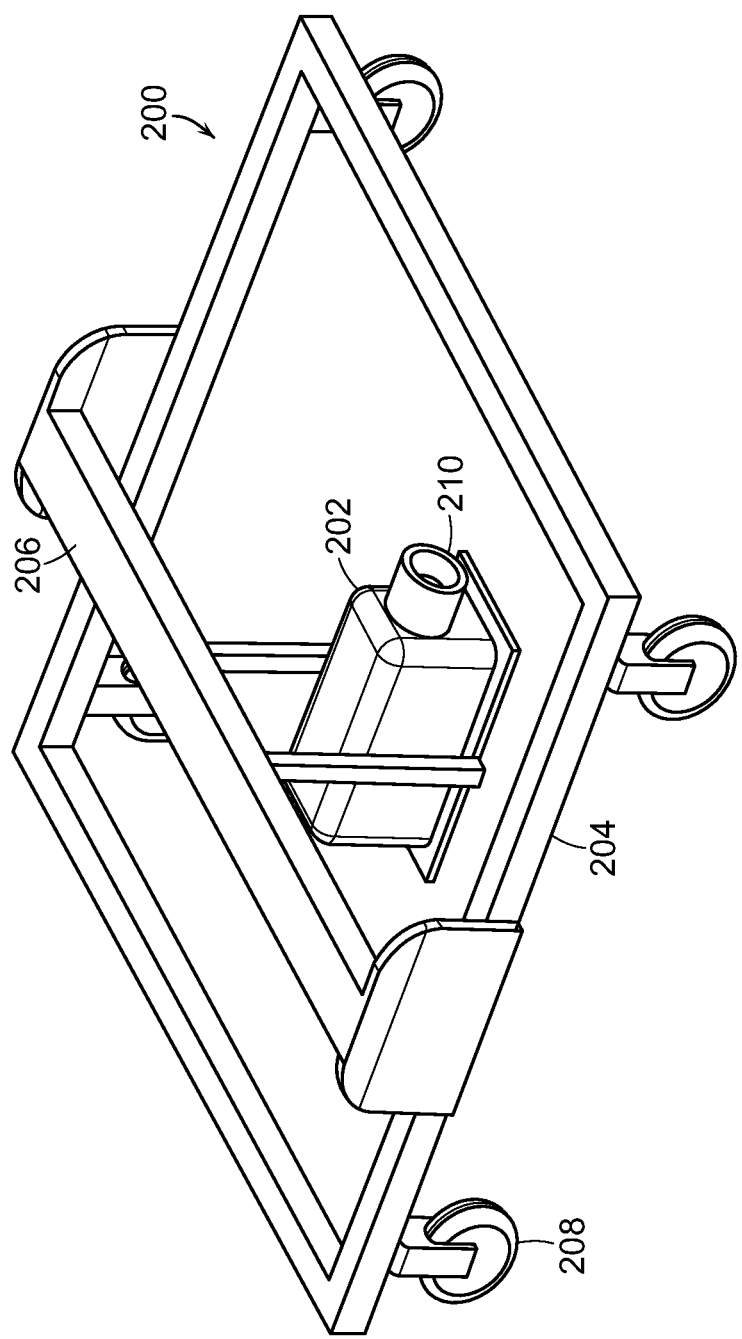
FIG. 2 of the accompanying drawings shows a perspective enlarged view of an image capturing apparatus in accordance with an exemplary embodiment of the present invention.

FIG. 2 of the accompanying drawing shows an enlarged perspective view of the image capturing apparatus 200, shown in FIG. 1 as image capturing apparatus 100. The image capturing apparatus 200 in FIG. 2 provides a closer illustration of the relationship amongst all of the components of the image capturing apparatus. First and foremost, FIG. 2 shows the camera 202 sitting on a platform 210, which allows it to be attached to the image capturing apparatus 200. The platform 210, being attached to and dropping down from the horizontal crossbar 206; allows for the camera 202 to move left and right within the chassis of the image capturing apparatus 200 itself; independent of the movement of the gantry 204 of the image capturing apparatus 200. Referring to the coordinate system 201 shown on FIG. 2, it can be seen that the camera 202 is allowed to move along the x-axis parallel to the direction of the horizontal crossbar 206. The present embodiment of the present invention achieves this movement by utilizing a chain belt type mechanism that is attached to the horizontal crossbar 206. However, other types of movement utilizing gears, tracks, or any other types of movement mechanism can all be used without departing from the scope and content of the present invention.

The horizontal crossbar 206 shown in this embodiment of the present invention shown in FIG. 2 is attached at the ends to the gantry 204 around the perimeter. This type of attachment allows the camera 202 to move in a front and back orientation along a different axis than previously described. Referencing the coordinate system 201, it can be seen that the camera 202 is now capable of moving along the y-axis that is perpendicular to the direction of the horizontal crossbar 206. Similar to the discussion above, the movement of the entire horizontal crossbar 206 along the y-axis may generally be achieved using a chain belt type mechanism that is attached to the frame of the gantry 204. However, other types of movement utilizing gears, tracks, or any other types of movement mechanism can all be used without departing from the scope and content of the present invention.

In the current embodiment of the present invention, the movement of the camera 202 along the horizontal crossbar 206 as well as the movement forward and aft along the gantry 204 may generally be accomplished using a stepper motor that controls the movement. The stepper motor may generally be controlled via a remove such as a CNC pendant of a computer keyboard that utilizes g-code communication, however, in alternative embodiments of the present invention different types of controller may be used without departing from the scope and content of the present invention.

Having a camera 202 that is capable of relative easy movement within the image capturing apparatus 200 is critical to the present invention because the current image capturing apparatus 200 is intended to be used on real grass in conjunction with a golfer hitting iron type or wedge type shots from realistic grassy condition. As most golfers know, hitting an iron type shot or wedge type shot will usually involve significant turf interaction, resulting in divots on the ground that makes it unsuitable for hitting the golf ball anymore. The present invention, in an attempt to minimize recalibration and setup time between each individual golf shots, allows the golfer to move to a different location in front of the camera 202 and adjusting the location of the camera 202 to maintain a consistent distance between the camera and the intended impact location.

The camera 202 shown in this exemplary embodiment of the present invention may generally be a high speed camera 202, capable of capturing the high speed video of the golfer as he or she performs a golf swing. In a preferred embodiment of the present invention, the high speed camera 202 may have a frame rate of greater than about 1,000 frames per second, more preferably between about 1,500 frames per second and about 6,000 frames per second, and most preferably between about 2,000 frames per second and about 6,000 frames per second.

Figure 3A:
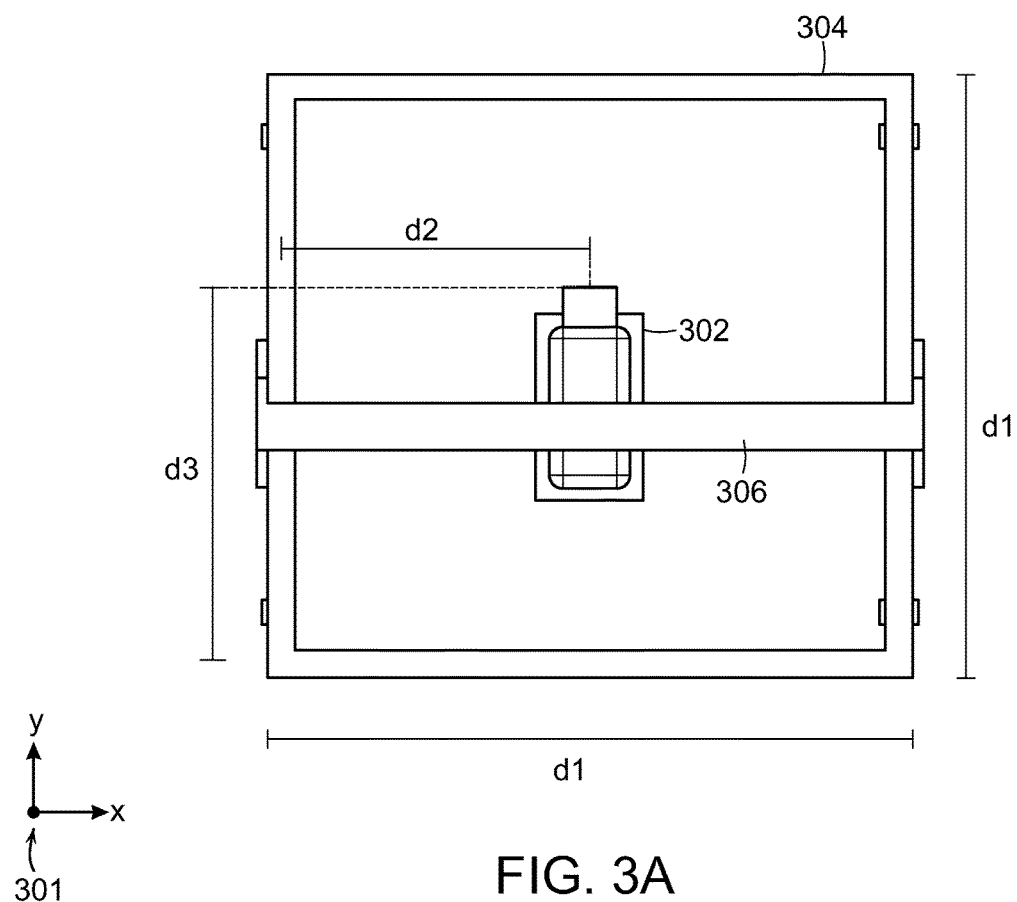
FIG. 3a of the accompanying drawings shows a top view of an image capturing apparatus with the camera set a specific location in accordance with an exemplary embodiment of the present invention.
Figure 3B:
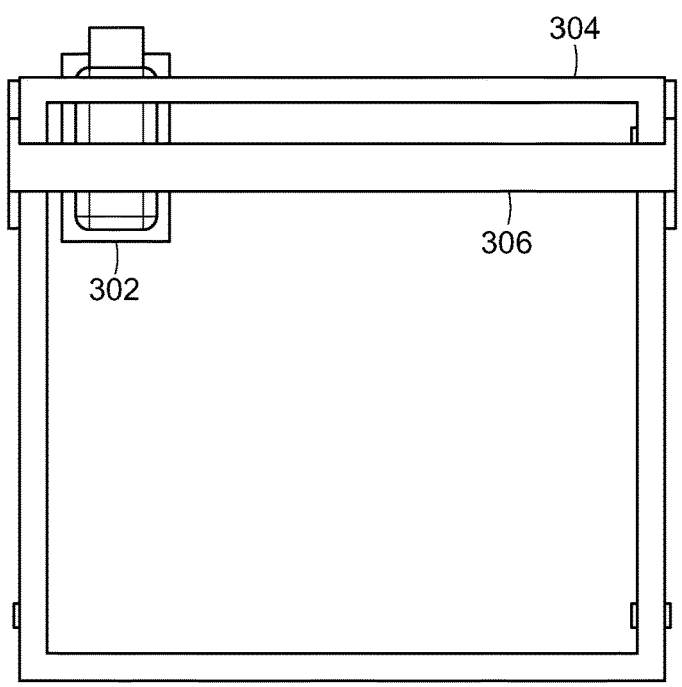
FIG. 3b of the accompanying drawings shows a top view of an image capturing apparatus with the camera set a specific location in accordance with an exemplary embodiment of the present invention.
Figure 3C:
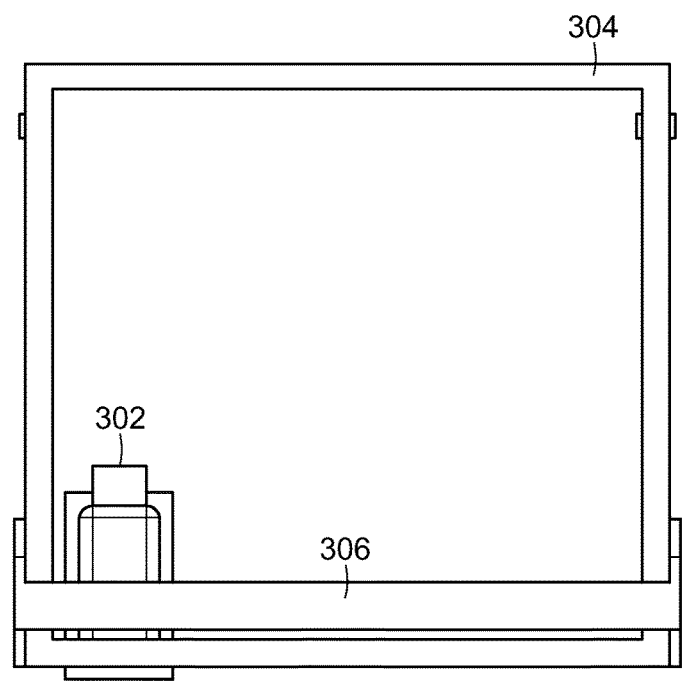
FIG. 3c of the accompanying drawings shows a top view of an image capturing apparatus with the camera set a specific location in accordance with an exemplary embodiment of the present invention.
Figure 3D:
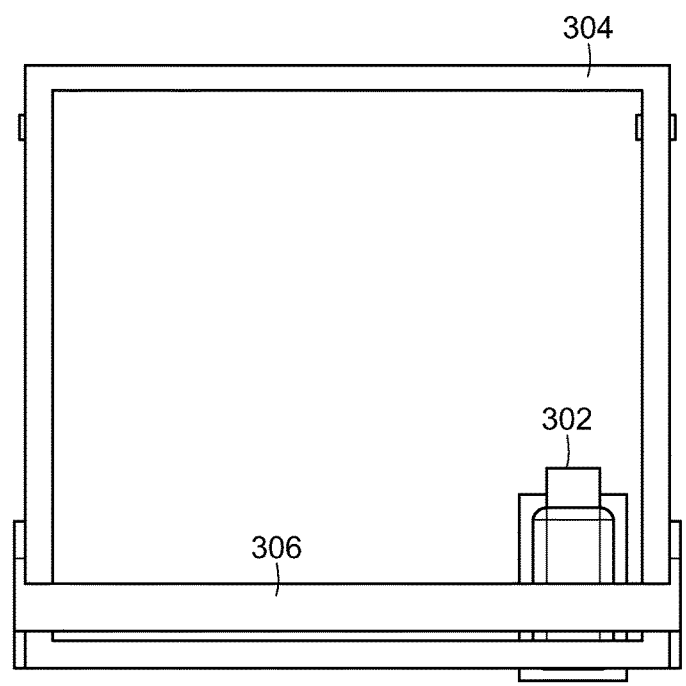
FIG. 3d of the accompanying drawings shows a top view of an image capturing apparatus with the camera set a specific location in accordance with an exemplary embodiment of the present invention.
Figure 3E:
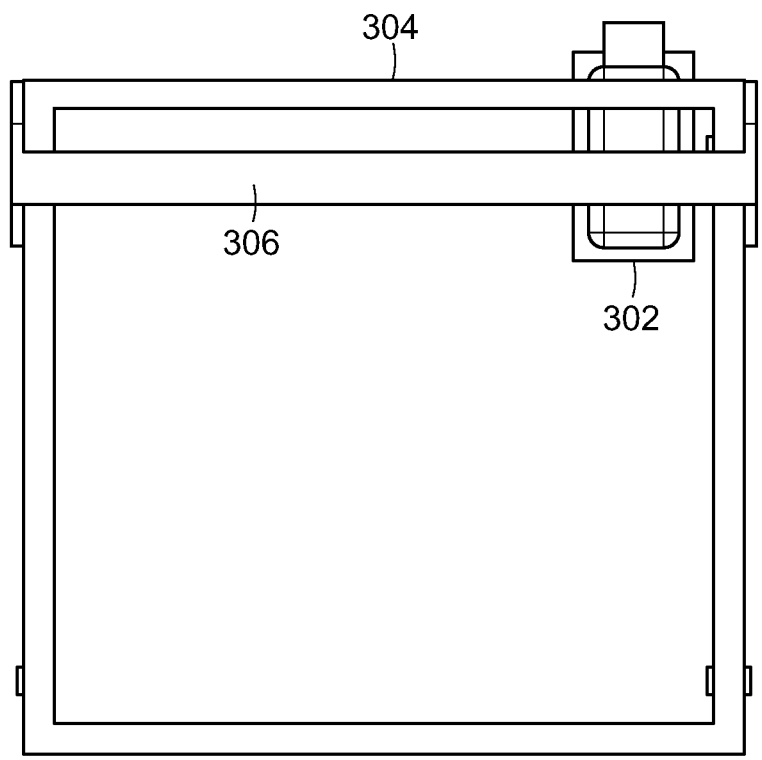
FIG. 3e of the accompanying drawings shows a top view of an image capturing apparatus with the camera set a specific location in accordance with an exemplary embodiment of the present invention.

FIGS. 3*a*-3*e* show top views of various settings or locations of the camera 302 in accordance with different embodiments of the present invention, allowing the various locations of the camera 302, relative to the base gantry 304 to be shown more clearly. FIG. 3*a* of the accompanying drawings shows the camera 302 being located at a centralized location on the gantry 304. Before discussing the actual location of the camera 302, it is worthwhile to discuss the dimension of the gantry 304. In the current exemplary embodiment of the present invention, the gantry 304 may be square in its footprint, having a length d1 and width d1 both being approximately 30 inches. This gantry 302 dimension allows the camera 302 to have a travel of at least 30 inches in both the x and y direction, yielding a capture range of 900 inches$^2$. The 900 inches$^2$ of capture range is preferred in this embodiment of the present invention because it allows a golfer to hit multiple shots without having to shift the gantry 304 and recalibrate the camera 302. Given the average size of a divot being approximately 15 inches$^2$, this current embodiment of the present invention will allow a golfer to hit approximately 60 shots on the high side, and about 25 shots on the low side before needing to shift the gantry 304 and recalibrate the camera 302.

Using the camera 302 that can shift and move with the golfer allows the golfer to adjust for the divots created by an iron type golf swing allows the camera 304 to capture multiple "performance variables" from each golf swing. "Performance variables", as referred to in the current specification, may generally include, but is not limited to angle of attack, dynamic loft, shaft lean angle, face angle to target line, lie angle, golf ball launch angle, and golf ball spin.

This aerial top view of the gantry 304 also allows the x and y axis of the coordinate system 301 to be identified more clearly. In this embodiment of the present invention shown in FIG. 3*a*, movement of the camera 302 along the x-axis is achieved by shifting the camera 302 along the horizontal cross-bar 306. Meanwhile, movement of the camera along the y-axis involves moving the entire horizontal cross-bar 306 along the gantry 302. In this embodiment of the present invention shown, the camera 302 is placed at a distance d2 of about 15 inches away from one side of the gantry 304 along the x-axis, and placed at a distance d3 of about 17 inches away from another side of the gantry 304 along the y-axis.

FIG. 3*b* through 3*e* of the accompanying drawings shows an alternative embodiments of the present invention wherein the camera 302 can be shifted to different locations within the gantry 304 either via the x-axis using adjustments along the horizontal cross-bar 306, or via the y-axis using adjustments along the gantry 304 itself. This allows the movement of the camera to adapt to the needs of the golfer to shift positions and take divots during their golf swing. Notice that in FIGS. 3*b*, and 3*e*, the location of the camera 302 lens may be placed outside the footprint of the gantry 304. These placement positions are not outside the scope of the present invention despite the fact that they do not fit entirely within the footprint of the gantry 304.

Figure 4:
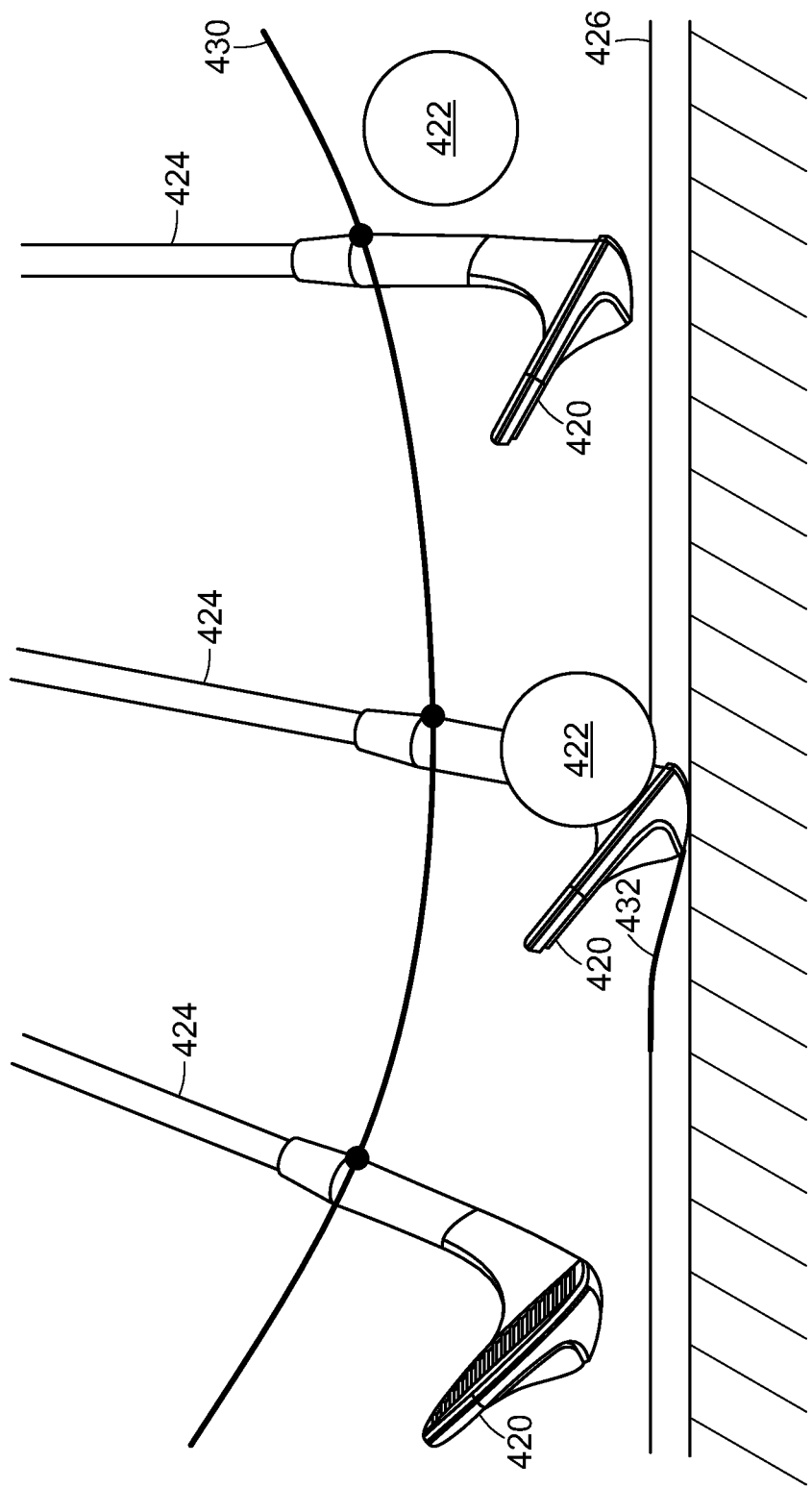
FIG. 4 of the accompanying drawings shows a simulated view of images captured from the camera illustrating the impact of a golf swing.

FIG. 4 of the accompanying drawing shows a schematic of an overview of the different conditions that a golf club 420 goes through during a golf swing. Although the camera usually focuses on individual frames, this overview shown in FIG. 4 provides some initial context to what an iron type golf club head 420 looks like when it interacts with the ground on an actual golf shot. First and foremost, it can be seen that on the left side of FIG. 4, golf club head 420 is approaching the golf ball 422 from a steep angle with a significant amount of shaft 42 lean. During impact, which is depicted by the figure in the middle of the page, the golf club head 420 may engage the ground plane 426 by hitting down on the golf ball 422 and going beneath the ground plane 426. This type of ball striking motion may generally leave a divot 432 on the ground, making that specific spot less desirable to hit another golf ball 422. Finally, on the right side of FIG. 4, the golf club head 420 has completed the golf swing and the golf ball 422 has left the striking face portion of the golf club head 420. It is at this point, where the shaft 424 may generally be substantially vertical. In order to provide a better illustration of the individual scenarios, FIGS. 5, 6, and 7 have been provided here with enlarged views of the golf club heads 420.

Figure 5:
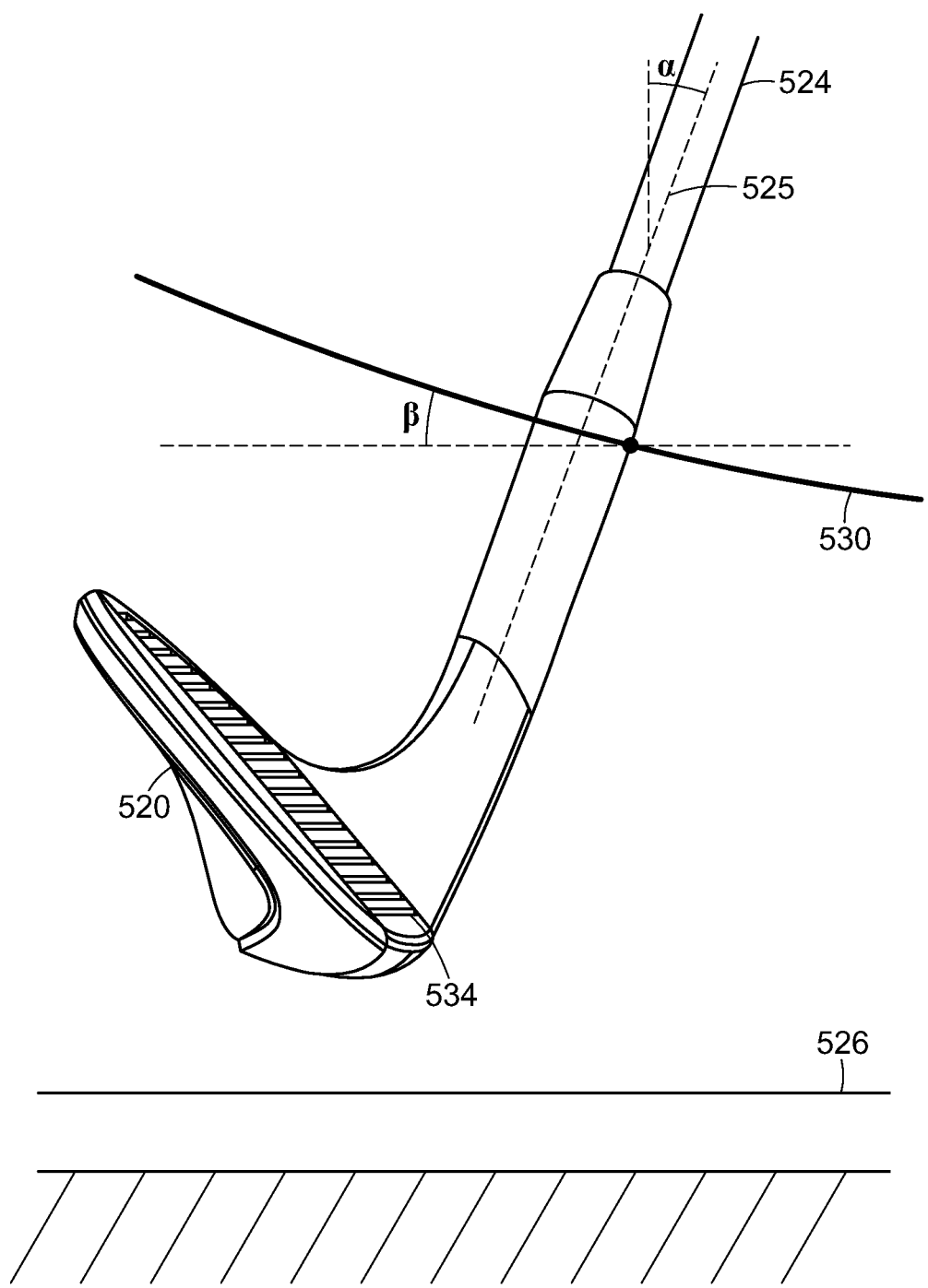
FIG. 5 of the accompanying drawings shows an enlarged view of an image captured by the camera illustrating the golf club before impact with a golf ball.

FIG. 5 of the accompanying drawings shows an enlarged view of a golf club head 520 right before it impacts a golf ball, allowing some of the "performance variables" such as angle of attack β and shaft lean angle α to be shown more clearly. In this enlarged view of the golf club head 520, we can see that before the golf club head 520 contacts the golf ball, it stands above the ground plane 526, coming in at an angle of attack β that follows the swing path 530 of the golf club head 520. The angle of attack β of each individual golfer may differ from each other depending on their particular golf swing, but may generally be between about −10 degrees to about −15 degrees, but could also be any other number depending on the golfer's golf swing. It is worthwhile to note here that the angle β here is in the negative, which is indicative of a forward shaft lean position relative to a horizontal ground plane. In addition to the angle of attach, FIG. 5 also shows the shaft lean angle α as the amount of forward shaft lean the golfer demonstrates before contacting a golf ball. Most golfers that are hitting down on a golf ball will have a shaft lean angle α of between about −6 degrees to about 20 degrees, but that number could differ depending on the particular golfer's swing to even being a negative number without departing from the scope and content of the present invention.

FIG. 5 of the accompanying drawings also allows another one of the "performance variable" called face angle to target line, or simply known as face angle to some in the industry. The face angle refers to the angle of the golf club head 520 as it relates to the target line, which in this illustration of FIG. 5, is pointed to the right. Although not specifically identified by any Greek symbols, the camera is capable of capturing this by focusing on the angle of the scorelines 532 relative to either the ground plane or the shaft axis 525.

Figure 6:
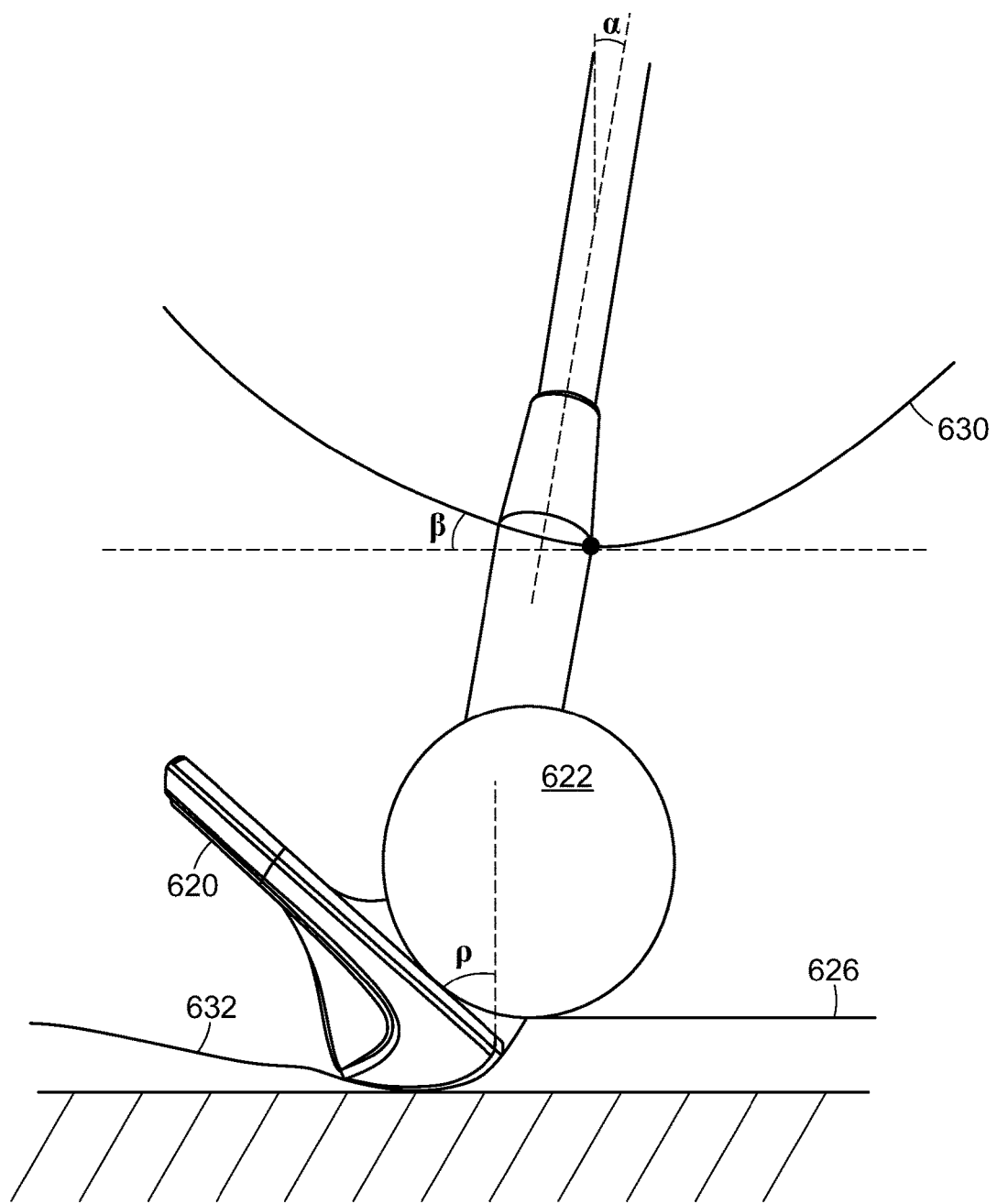
FIG. 6 of the accompanying drawings shows an enlarged view of an image captured by the camera illustrating the golf club right as it impacts a golf ball.

FIG. 6 of the accompanying drawings shows an enlarged view of a golf club head 620 right as it impacts a golf ball 622. In this enlarged view of the golf club head 620, we can see that the when the golf club head 620 contacts the golf ball 622, it goes beneath the ground plane 626, creating a divot 632 in the ground. This divot 632 shown in this embodiment of the present invention may occur slightly before impact with a golf ball 622 This interaction with the ground 626 makes it critical for the camera to be able to adjust its location and shift the focus of the camera to an alternate location that doesn't contain the divot 632. In this frame of the golf swing captured in FIG. 6, it can be seen that the angle of attack β, may still be in a downward motion following swing path 630. This angle of attack β, depending on the golfer's swing, may generally be between about −10 degrees to about −15 degrees. The shaft lean angle α in this embodiment of the present invention may also change depending on the golfer, but may generally be between about −6 degrees to 20 degrees.

In addition to the above, FIG. 6 also shows another one of the "performance variable" by helping identify the dynamic loft ρ. Dynamic loft ρ may generally relate to the loft of the golf club head 620 relative to a vertical plane. This dynamic loft ρ, which occurs during a golf swing, is generally different from the actual static loft of the golf club head 620 because dynamic loft ρ includes other variables such as shaft lean angle α, swing path 630 amongst numerous other variables. In this image captured in FIG. 6, the static loft of the golf club head 620 may be about 60 degrees, but the dynamic loft ρ may be less due to the forward shaft lean angle α, yielding a dynamic loft ρ of about 45 degrees.

Figure 7:
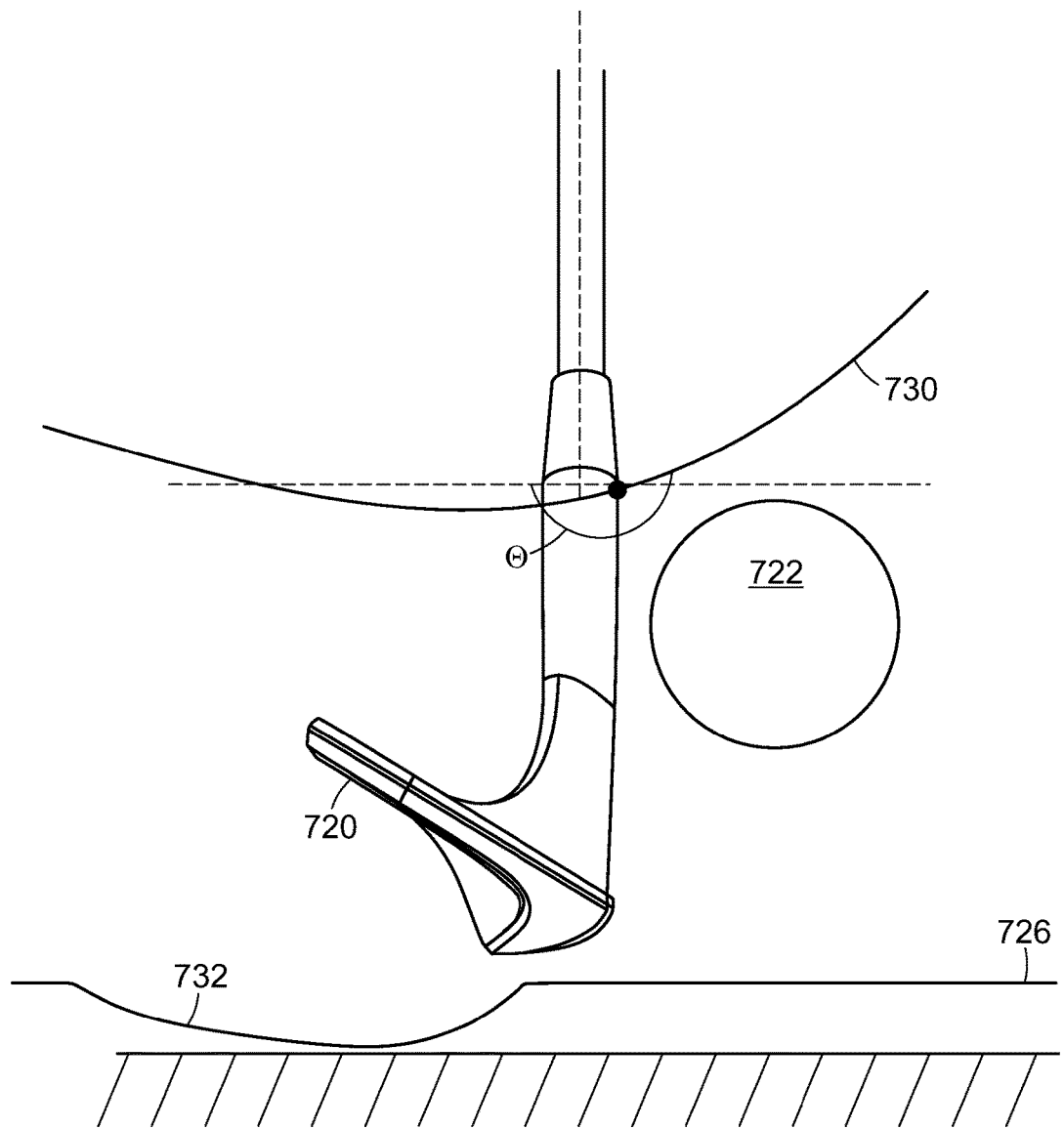
FIG. 7 of the accompanying drawings shows an enlarged view of an image captured by the camera illustrating the golf club right after it impacts a golf ball.

FIG. 7 of the accompanying drawings shows an enlarged view of a golf club head 720 after it has impacted the golf ball 722. In this enlarged view of the golf club head 720, we can see that after the impact with the golf ball 722, the golf club head 720 leaves a divot 732 on the ground, and begins travelling in an upward direction. In this frame of the golf swing captured in FIG. 7, the angle of attack θ a positive number to represent that the golf club head is heading in an ascending path, more specifically between about 10 degrees and 20 degrees. A positive path generally mean that the golf club head is traveling along a swing path 730 that is now in an upward motion. Finally, the shaft lean angle in this embodiment is generally 0 degrees at some point during the moments after the impact.

In this FIG. 7 provided by the accompanying drawings, the camera 720 is capable of capturing even more information relating to the "performance variable". More specifically, in FIG. 7, the golf ball 722 launch angle and the golf ball 722 spin can also be captured by the camera 720 during the execution of a golf swing.

Figure 8:
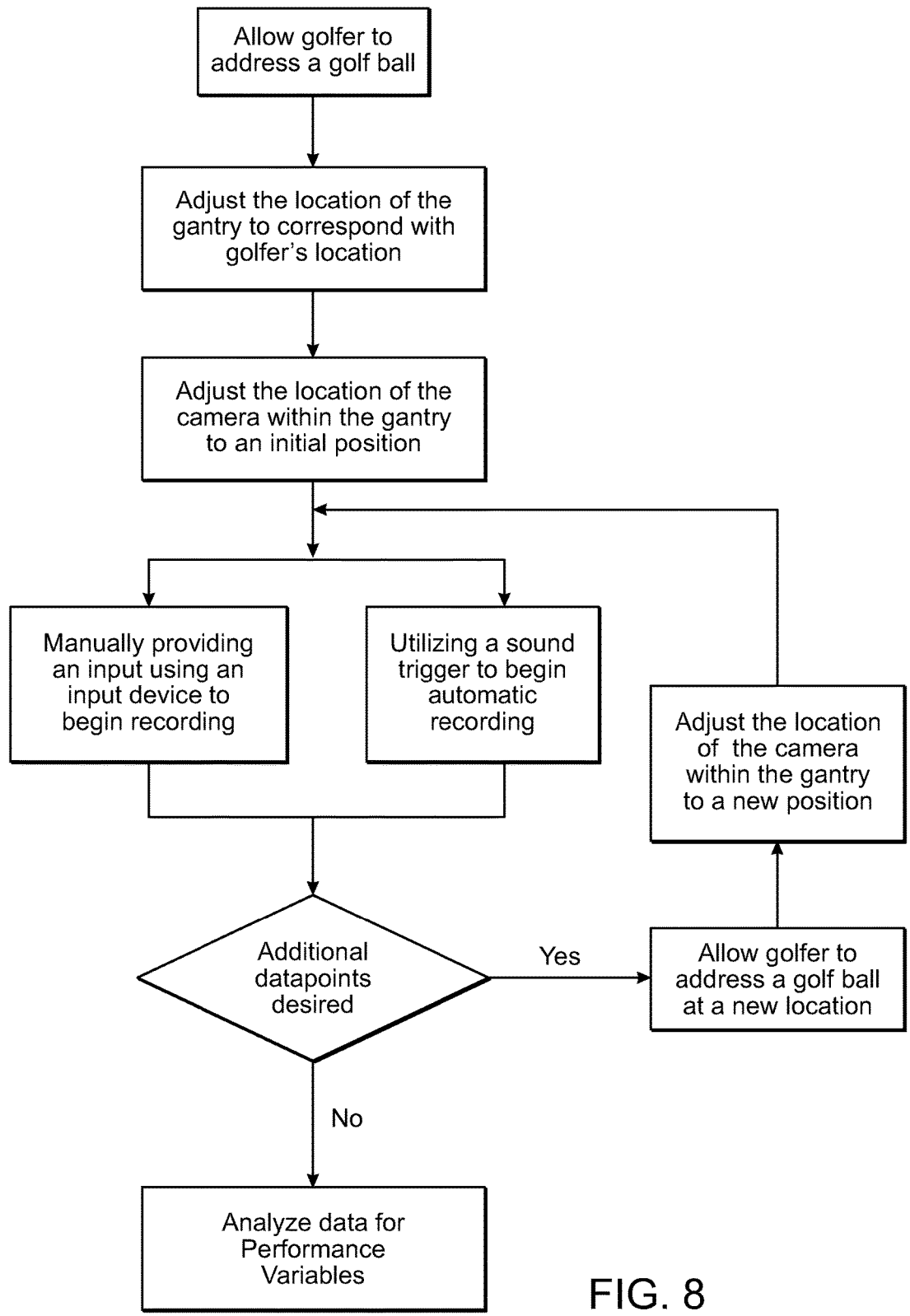
FIG. 8 of the accompanying drawings shows a flow chart diagram illustrating the method of fitting in accordance with the present invention.

FIG. 8 of the accompanying drawing provides a flow diagram of how the image capturing apparatus works in conjunction with the camera to generate the images shown in FIG. 5 through FIG. 7 to help fit a golfer using the golfer's "performance variables". The golfer is first allowed to address a golf ball, wherein a reference point will be given to set up and adjust the location of the gantry. The location of the gantry, which serves as the base for the image capturing apparatus, is riding on wheels, which allows it to be mobile and adaptable to the setup location where the golfer has decided to address the ball. Once the location of the gantry is determined, the next step in the diagram allows for fine tune adjustment of the camera sitting on a platform on the gantry to an initial position. This fine tune adjustment, as described earlier, allows the golfer to take multiple iron type golf swings without the need for a complete recalibration and movement of the gantry. After the adjustment of the location of the camera in the initial position, the recording can begin manually by using an input device that is connected to a computer. Alternatively, in a more preferred scenario, the recording can be initiated by using a sound trigger. Once the recording is complete, the flowchart illustrates two different options depending on whether additional data points are desired. If no additional data points are desired, the recorded video of the golfer is analyzed for performance variables. However, if additional data points are desired, the golfer may address the golf ball at a new location, and the location of the camera within the gantry may be adjusted accordingly to be aligned with the new location of the golf ball.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the above specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. A system for capturing a golf swing comprising:
    a striking location to accommodate a golf ball to be struck with a golf club;
    an image capturing apparatus further comprising:
        a gantry providing structural support to said image capturing apparatus;
        a plurality of wheels attached to a bottom surface of said gantry in order to provide mobility for said image capturing apparatus;
        a horizontal cross bar adjustably attaches to a top surface of said gantry;
        a platform adjustably attaches to said horizontal cross bar via a plurality of two or more vertical posts,
        wherein said platform attaches to a terminal end of said plurality of two or more posts; and
        a camera adapted to come in direct contact with said platform by sitting on said platform, said camera is capable of capturing an at least one performance variable,
        wherein said adjustable horizontal cross bar and said adjustable platform combine to allow said camera to be adjusted along at least two axis across said image capturing apparatus,
    a computer operatively coupled to said camera, said computer further comprising:
        a memory for storing said at least one performance variable gathered from said camera; and
        an analyzing software for analyzing said at least one performance variable supplied to said computer.

2. The system claim 1, wherein said at least one performance variable comprises at least one of an angle of attack, a dynamic loft, a shaft lean, a face angle, a lie angle, a golf ball launch angle, and a golf ball spin.

3. The system of claim 2, wherein said at least one performance variable is used to recommend a golf club head for a golfer.

4. The system of claim 1, wherein said at least two axis across said image capturing apparatus are perpendicular to each other.

5. The system of claim 4, wherein said adjustment of said horizontal cross bar is achieved via a chain belt type mechanism.

6. The system of claim 5, wherein said adjustment of said platform is achieved via a chain belt type mechanism.

7. The system of claim 1, wherein said gantry has a width of about 30 inches and a length of also about 30 inches.

* * * * *